March 28, 1950
C. HOLLERITH
2,501,941
HYDRAULICALLY ACTUATED BRAKE VALVE
Filed March 13, 1948
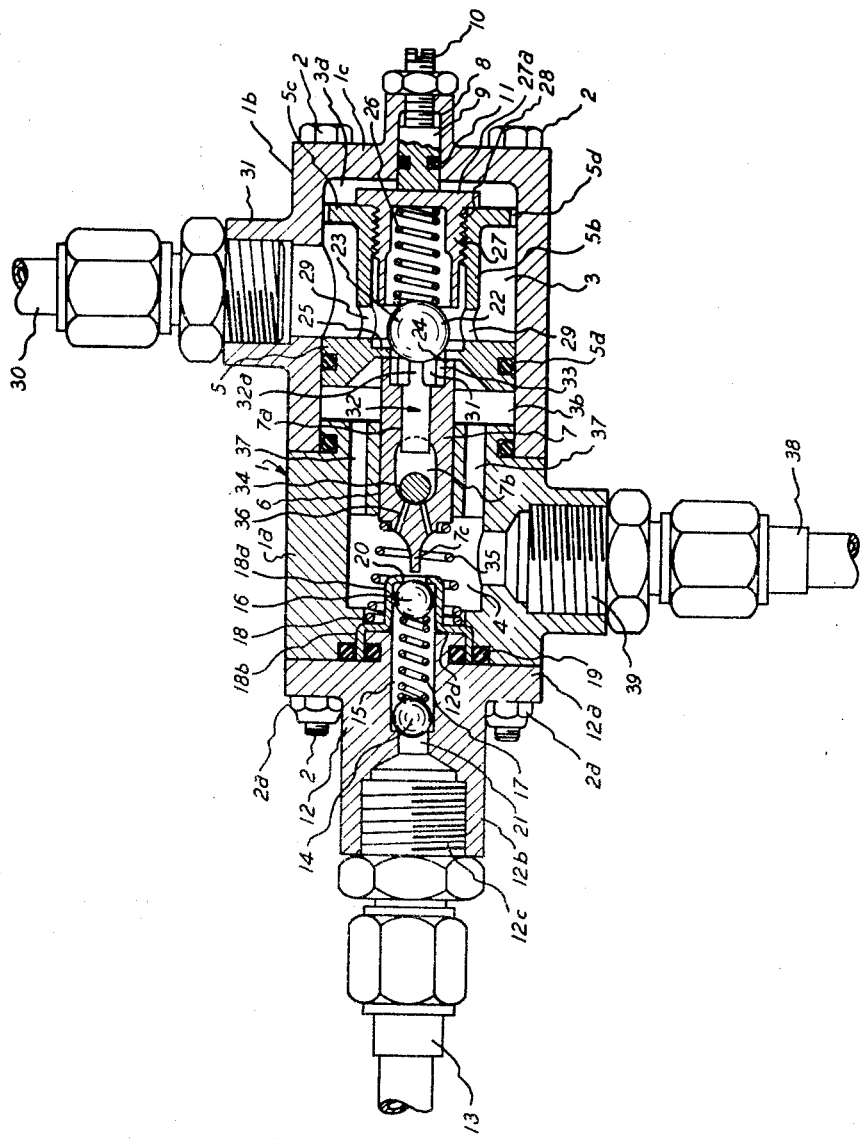
INVENTOR
CHARLES HOLLERITH
BY Beaman & Patch
ATTORNEY Patented Mar. 28, 1950

2,501,941

UNITED STATES PATENT OFFICE 2,501,941

HYDRAULICALLY ACTUATED BRAKE VALVE

Charles Hollerith, Jackson, Mich., assignor, by mesne assignments, to The B. F. Goodrich Company, Akron, Ohio, a corporation of New York Application March 13, 1948, Serial No. 14,795

5 Claims. (Cl. 137—153)

1

This invention relates to hydraulically actuated brake systems such as are employed on aircraft to brake the landing wheels thereof and which employ a brake control metering valve actuated by a brake pedal or equivalent operating member (usually actuated by the pilot or co-pilot) and a pressure accumulator connected in a fluid circuit for supplying the required brake operating pressure.

An object of the present invention is to provide a hydraulic relay valve for use in a brake system as above described and by which relay valve the required fluid pressure is capable of being supplied to the brake (or brakes) with the relay valve located in close proximity to the brake and the time lag in operating the brake reduced to a minimum.

A particular object of the invention is to provide a hydraulic relay valve which is capable of being actuated by the fluid pressure supplied via the standard brake control metering valve so as normally to actuate the brake (or brakes) with fluid pressure supplied from the accumulator, whereby the time lag in operating the brake is reduced to a minimum with the relay valve located in close proximity to the brake.

A further and particular object of the invention is to provide an accumulator fed hydraulic relay valve which is capable of functioning to supply the braking fluid pressure from the standard brake metering valve in the event of a failure occurring in the accumulator line, and this with the prevention of loss of the brake operating pressure fluid from the relay valve and through the broken or defective accumulator line.

These and other objects and advantages of the invention will appear clear from a consideration of the following description of one specific form of relay valve in accordance with the invention, given by way of example, and as shown in the accompanying drawing, which shows the relay valve in longitudinal section.

In carrying the invention into effect in one convenient manner as illustrated in the drawing a hydraulic brake relay valve is provided comprising a casing, indicated generally at 1, composed of two co-axial parts 1a and 1b united by through bolts 2 and nuts 2a and formed on their interior with differential diameter cylinder spaces 3 and 4, of which the cylinder space 3 serves to accommodate a piston 5 for reciprocation therein whereas the cylinder space 4 is formed with a central bore forming portion 6 serving to guide a plunger member 7 for reciprocation within the casing.

The casing part 1b has an outer end wall 1c

2 formed with a central axial bore 8 in which a stop pin 9 is mounted for sliding adjustment under the control of a set screw 10, the stop pin having sealing engagement with the bore 8 by means of the sealing ring 11.

The casing part 1a is closed at its outer end by a separately formed casing part 12 having a flange portion 12a, by which this end casing part is secured in position by the nuts 2a, and having also a central pipe socket portion 12b, the hollow interiorly screw-threaded portion 12c of which serves for the attachment of an oil pressure line 13 and communicates, via a ball valve 14, with an axial bore 15, normally closed at its opposite end by another ball valve 16, there being a light coil spring 17 operative between the two ball valves. The latter are of somewhat smaller diameter than the diameter of the bore portion 15, and the inner end portion of the latter is formed by the central cylindrical portion 18a of a separately formed cap member 18 having an enlarged annular base which fits over the inner spigot end 12d of the pipe union 12 and has its peripheral wall 18b sealed in position between this spigot end 12d, and the adjacent portion of the casing part 1a, by means of the opposed sealing rings 19. The ball valve 16 normally closes a restricted central aperture 20 formed at the inner end of the cylindrical cap part 18, whereas the axially spaced ball valve 14 is adapted to have sealing engagement with a restricted bore portion 21.

The piston 5 carries a sealing ring 5a and is formed with a reduced intermediate sleeve portion 5b having an outwardly directed radial flange 5c at its opposite end, remote from the actual piston part 5, which flange is guided for reciprocation within the cylinder space 3 and has a series of axial ports 5d in its outer periphery providing restricted communication between the main cylinder space 3 on one side of said flange and the auxiliary cylinder space 3a on the opposite side of this flange.

The piston 5 has a hollow interior bore 22 within which an enlarged ball 23 is mounted so as normally to close a central opening 24 in the piston 5, which is of annular formation as shown and presents an interior radial ledge 25 with which the adjacent end of the plunger 7 normally has abutting engagement, due to the influence of a coil spring 26 and an opposed coil spring 35 later described. This coil spring 26 is accommodated within a hollow plug 27 screwed, as indicated at 28, into the outer end of the piston sleeve portion 5b and having a cap end 27a which offers an abutment for the inner end of the adjustable stop pin 9. The coil spring 26 serves normally to urge the ball valve 23 to its closed position with respect to the central piston opening 24.

Ports 29 at the inner end of the piston sleeve portion 5b provide communication between the hollow piston interior 22 and the annular cylinder space 3, the latter being in communication with an oil pressure pipe line 30 connected to the casing 1 via the pipe union socket 31.

The plunger 7 has a central axial bore 7a and one end of which there is an enlarged cylindrical space 31, into which the central spigot-like extension 32a of a smaller plunger member 32 normally projects and the peripheral wall of which annular space is formed with a series of circumferentially spaced axial slots 33.

This smaller plunger 32 is accommodated within the bore 7a of the larger plunger 7 and extends at one end into an axially elongated slot 7b which extends transversely across the plunger 7 and itself accommodates therein a fixed transverse guide pin 34.

At its opposite end, remote from the space 33, the plunger 7 is formed with a central spigot-like extension 7c which is disposed to lie immediately opposite the opening 20 and ball valve 16.

A coil spring 35, extending between the plunger 7 and the cap 18, serves normally to hold the plunger 7 against the piston ledge 25, with the spigot 7c slightly spaced from the ball valve 16 and the pin 34 located at the left-hand end of the slot 7b, as seen in the drawing.

The spigot end 7c of the plunger is formed with air-bleed ports, while the plunger guide bore portion 6 of the casing part 1a is formed with a series of circumferentially spaced axial bores 37 affording communication between the cylinder space 4 and the cylinder space 3b.

The cylinder space 4 is in communication with an oil pressure pipe line 38 via a pipe union 39 on the casing part 1a.

In operation, the pipe 13 is connected back to the accumulator (not shown), the pipe 30 is connected back to the standard brake control metering valve, (also not shown and with which a brake operating pedal is usually associated) and the pipe 38 is connected to the wheel brake, or brakes (also not shown). The actual hydraulic brake system does not form a part of this invention and will be well known to those skilled in the art from the above described connection of the pipes 13, 30 and 38. It may be further mentioned, however, that in the complete hydraulic system the accumulator also has a pipe delivering therefrom to the brake control metering valve, that there is a pipe leading from the latter to a supply tank, that the latter is in turn connected to the accumulator via a pump, and that there is two-way direct pipe connection between the brake (or brakes) and the brake control metering valve.

In the normal condition of the relay valve, with the brakes unapplied the parts of the relay valve are as seen in the drawing. In this condition the high pressure oil from the accumulator is sealed against entry into the cylinder space 4 by the closed condition of the ball valve 16. Also the piston 5 is in its normally retracted condition, as shown, with the ball valve 23 closing the central piston opening 24 and the spigot 7c of the plunger 7 held spaced apart slightly from the closed ball valve 16. The small plunger 32 is also positioned, as shown, with its spigot end 32a lightly touching the ball valve 23 and the fixed transverse pin 34 at the lefthand end of the elongated slot 7b.

It should be mentioned here that the distance between the ball valve 16 and the spigot 7c is smaller than the effective length of the slot 7b, whereby an opened condition of the ball valve 16 will obtain before the pin 34 is located against the end of the smaller plunger 32 which projects into the slot 7b when, as will be described later, relative movement is allowed to take place between the plungers 7 and 32.

Assuming now that the brake pedal is applied and the associated brake control metering valve is correspondingly influenced, in the known manner, the resulting displacement of the oil in the pipe 30 will urge the piston 5 and combined plungers 7 and 32 bodily, as a unit, to the left until the ball valve 16 is pushed away from the opening 20, when the high pressure oil from the accumulator, previously trapped behind this ball valve, will immediately flow into the cylinder space 4 and along the pipe 38 to apply the brake (or brakes).

The flow of the oil from the pipe 30 into the annular cylinder space 3 is accompanied by a displacement of the oil through the ports 5d to the space 3a, in which this pressure oil maintains an assisting force upon the piston 5 to move the same to the left to unseat the ball valve 16.

In the application of the brake (or brakes), the pressure will build-up in the cylinder space 4 and by acting upon the piston 5, via the axial ports 37, will urge the latter to the right, with a corresponding displacement of the oil behind the piston and in the cylinder spaces 3 and 3a, until, in the fully applied condition of the brakes, the spigot 7c will be removed from engagement with the ball valve 16 and the latter is immediately closed by the prevailing pressure behind it and in the conduit 15.

With the movement of the piston 5 as thus far described the brakes are applied by the pressure oil supplied from the accumulator under the control of the pressure oil delivered through the brake control metering valve at the brake pedal, which pressure oil, however, has no direct action on the brake (or brakes).

This relay valve, however, is so constructed that in the event of the high pressure line 13 failing, as by the line being broken, the low pressure oil from the brake control metering valve can be relied upon to apply the brakes, and this automatically, or without any conscious effort on the part of the pilot. Thus, in the event that the pressure fails in the line 13 and the brake pedal is actuated, movement of the spigot 7c against the ball valve 16 will merely lift this valve away from the opening 20 without there being any pressure re-action against the piston 5 to restrain further movement thereof in the opening direction of this ball valve 16. Accordingly, the combined piston 5 and plungers 7 and 32 are permitted to travel together further to the left, as seen in the drawing, than they would otherwise do if high pressure oil was delivered through the opening 20. Such combined and extended movement of these parts will continue until the smaller plunger 32 is brought up against the cross pin 34. When this occurs, further movement of the piston 5 and plunger 7 to the left will be accompanied by relative movement between the plunger 7 and its inner plunger 32, with the latter remaining behind, or stationary. In so doing the spigot 32a of the stationary plunger will hold the ball valve 23 against movement with its piston 5 and this against the action of the coil spring 26. Accordingly, a passageway will be opened up for the flow of the pressure oil, from the line 30 and cylinder space 3, past the opened ball valve 23, through the opening 22 and slots 33, into the cylinder space 3b, from whence this oil is free to flow to the brake line 38 via the axial ports 37 and cylinder space 4. At the same time an escape of this pressure oil into the broken accumulator line 13 is prevented by the action of the ball valve 14, which then functions as a check valve to close the accumulator line from the conduit 15.

As the pressure builds up in the brake (or brakes), with the use of the relay valve under this last described condition, the oil pressure will urge the piston 5 to the right and leave the coil springs 25 and 26 free to restore the plunger 7 and ball valve 23 to their normal positions, as shown in the drawing.

It will be appreciated that the relay valve as a whole can be located as near the brake (or brakes) as possible and can normally be supplied with the brake operating oil direct from the accumulator, the standard brake control metering valve merely functioning to operate the relay valve under normal conditions of operation, that is, with the accumulator line 13 intact. This lay-out possesses the advantage that since it allows the relay valve to be positioned in close proximity to the brake, the time lag in operating the brake is materially reduced, due to the smallness of the amount of oil which it is required to move along the line 38.

The improved lay-out possesses the added advantage that in the event of the pressure in the line 13 failing the oil delivered from the brake control valve can be relied upon to feed the brake through the relay valve as above described, with the ball valve 14 preventing loss of this oil through the broken line 13, notwithstanding the fact that the time lag in applying the brakes will then be longer.

Having thus described one practical embodiment and operation of the invention what is claimed is as follows:

1. A hydraulic relay valve for a hydraulic brake system, comprising a hollow casing having a fluid pressure inlet, a piston reciprocable within said casing under the influence of the pressure fluid delivered to one side of said piston from said inlet, the casing having another fluid pressure supply inlet on the opposite side of the piston, a valve member normally closing said second inlet and an actuating member for said valve, said actuating member being influenced by movements of said piston to control the opening and closing movements of the valve member and the casing having a pressure fluid delivery outlet through which pressure fluid is capable of being delivered from the casing under the control of said piston movements.

2. A hydraulic relay valve for a hydraulic brake system comprising a hollow casing having a fluid pressure inlet adapted for connection with one source of fluid pressure, a piston reciprocable within said casing under the influence of the pressure fluid delivered to one side of said piston from said inlet, the casing having another fluid pressure supply inlet adapted for connection with another source of fluid pressure and admissible on the opposite side of the piston, a valve member normally closing said second inlet, and an actuating member for said valve, said actuating member being connected with said piston for movement with the latter to control the opening and closing movements of the valve member and the casing having a pressure fluid delivery outlet through which the pressure fluid from said second source is delivered from the casing under the control of said piston movements, the said first fluid pressure source normally merely controlling the movement of said piston to open said valve.

3. A hydraulic valve for a hydraulic brake system comprising a hollow casing having a fluid pressure inlet adapted for connection with one source of fluid pressure, a hollow piston reciprocable within said casing under the influence of this pressure fluid delivered to one side of said piston from said inlet, a valve member normally closing the interior of said piston against a flow of said fluid pressure to the opposite side of the piston, the latter being otherwise sealed against such a fluid flow, another fluid pressure supply inlet on said casing adapted for connection with another source of fluid pressure for admission to the interior of said casing on the opposite side of said piston, a delivery outlet from the casing for pressure fluid admitted into the casing upon said opposite piston side, a valve member normally closing said second inlet against a flow of the second said fluid into the casing interior, and an actuating member for said second mentioned valve, said actuating member being influenced by the pressure fluid from said first source to open said second mentioned valve and allow the pressure fluid from said second fluid pressure source to be admitted into the casing for delivery through said outlet.

4. A hydraulic valve for a hydraulic brake system comprising a hollow casing having a fluid pressure inlet adapted for connection with one source of fluid pressure, a hollow piston reciprocable within said casing under the influence of this pressure fluid delivered to one side of said piston from said inlet, a valve member normally closing the interior of said piston against a flow of said fluid pressure to the opposite side of the piston, the latter being otherwise sealed against such a fluid flow, another fluid pressure supply inlet on said casing adapted for connection with another source of fluid pressure for admission to the interior of said casing on the opposite side of said piston, a delivery outlet from the casing for pressure fluid admitted into the casing upon said opposite piston side, a valve member normally closing said second inlet against a flow of the second said fluid into the casing interior, an actuating member for said second mentioned valve, said actuating member being influenced by the pressure fluid from said first source to open said second mentioned valve and allow the pressure fluid from said second fluid pressure source to be admitted into the casing for delivery through said outlet, a second valve actuating member operable to unseat said piston valve member upon a failure of supply of said second fluid pressure into the casing when said valve member for said second inlet is opened, whereby the first said fluid pressure supply is free to flow past the piston valve to the said delivery outlet, and a check valve member associated with said second inlet and reactable to the pressure of the first said pressure fluid to close this check valve, whereby to prevent loss of this pressure fluid through said second inlet.

5. A hydraulic valve as claimed in claim 4 wherein said valve actuating members consist of a first plunger movable with the piston to control the actuation of the valve member for said second inlet and a second plunger member normally movable in unison with said first plunger and piston but movable relatively to the latter to unseat the piston valve member upon an extended movement of the piston in the direction of opening the valve member of said second inlet, whereby the pressure fluid from the first said inlet is then allowed to flow past the piston and through said delivery outlet.

CHARLES HOLLERITH.

REFERENCES CITED

The following references are of record in the file of this patent:

UNITED STATES PATENTS

| Number | Name | Date |
|---|---|---|
| 2,281,138 | Christensen | Apr. 28, 1942 |
| 2,343,698 | Parnell | Mar. 7, 1944 |

FOREIGN PATENTS

| Number | Country | Date |
|---|---|---|
| 602,118 | Germany | Sept. 1, 1934 |
| 666,105 | Germany | Oct. 11, 1938 |